US011165883B2

(12) United States Patent
Carrier

(10) Patent No.: US 11,165,883 B2
(45) Date of Patent: Nov. 2, 2021

(54) ENTRY POINT CLASSIFICATION OF REQUESTS REQUIRING ACCESS TO DATA

(71) Applicant: BANK OF AMERICA CORPORATION, Charlotte, NC (US)

(72) Inventor: Nancy Carrier, Jacksonville, FL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 85 days.

(21) Appl. No.: 16/238,000

(22) Filed: Jan. 2, 2019

(65) Prior Publication Data
US 2020/0213416 A1 Jul. 2, 2020

(51) Int. Cl.
*G06F 16/909* (2019.01)
*G06N 20/00* (2019.01)
*H04L 29/06* (2006.01)
*H04L 29/08* (2006.01)
*G06F 16/906* (2019.01)

(52) U.S. Cl.
CPC ............ *H04L 67/32* (2013.01); *G06F 16/906* (2019.01); *G06N 20/00* (2019.01); *H04L 63/02* (2013.01); *H04L 65/1046* (2013.01)

(58) Field of Classification Search
USPC ................. 709/220, 223–226, 238, 240, 241
See application file for complete search history.

(56) References Cited

U.S. PATENT DOCUMENTS

| 5,778,434 | A | 7/1998 | Nguyen et al. |
| 6,243,815 | B1 | 6/2001 | Antur et al. |
| 6,304,906 | B1 * | 10/2001 | Bhatti ................. H04L 12/2856 370/395.43 |
| 7,206,848 | B1 | 4/2007 | Zara et al. |
| 7,565,685 | B2 | 7/2009 | Ross et al. |
| 7,685,436 | B2 | 3/2010 | Davis et al. |
| 7,779,255 | B2 | 8/2010 | LiVecchi |
| 7,849,059 | B2 | 12/2010 | Prahlad et al. |
| 7,937,345 | B2 | 5/2011 | Schmidtler et al. |
| 7,958,067 | B2 | 6/2011 | Schmidtler et al. |
| 8,037,518 | B2 | 10/2011 | Buer |

(Continued)

*Primary Examiner* — Younes Naji
*Assistant Examiner* — Da T Ton
(74) *Attorney, Agent, or Firm* — Michael A. Springs; Moore & Van Allen PLLC; James C. Edwards

(57) ABSTRACT

Embodiments of the invention are directed to classifying requests associated with personal data at or before a point of entry to a trusted computing network. The invention provides for determining whether a request associated with personal data requires classification (for example, whether the request is impacted by regulations or other requirements necessitating classification/categorization). The determination may be based on what entity is requesting the data, the origin of the request, whose data is being requested, the type of action associated with the request and/or the data elements associated with the request. In addition, once the request has been determined to require classification the specific classification is determined and assigned to the request. The classification may be determined based on the rules associated with the regulation or other requirement(s) necessitating the classification/categorization. The classification may identify rules for processing the request along with routing for the request.

14 Claims, 6 Drawing Sheets

(56) References Cited

U.S. PATENT DOCUMENTS

| | | | |
|---|---|---|---|
| 8,205,239 B1* | 6/2012 | Satish | H04L 63/126 |
| | | | 726/1 |
| 8,406,525 B2 | 3/2013 | Ma et al. | |
| 8,463,919 B2 | 6/2013 | Tarquini et al. | |
| 8,589,397 B2 | 11/2013 | Fujimaki | |
| 9,015,301 B2 | 4/2015 | Redlich et al. | |
| 10,554,809 B1* | 2/2020 | Edwards | H04M 3/2218 |
| 2004/0093506 A1 | 5/2004 | Grawrock et al. | |
| 2005/0160209 A1 | 7/2005 | Van Doren et al. | |
| 2007/0203937 A1 | 8/2007 | Prahlad et al. | |
| 2008/0022049 A1 | 1/2008 | Hughes et al. | |
| 2008/0244697 A1* | 10/2008 | Himmel | G06F 21/6218 |
| | | | 726/1 |
| 2016/0350674 A1* | 12/2016 | Midboe | H04L 67/327 |
| 2017/0160971 A1 | 6/2017 | Gokhale et al. | |
| 2018/0013730 A1* | 1/2018 | Ling | G06F 21/6209 |

* cited by examiner

ENTRY POINT CLASSIFICATION OF REQUESTS REQUIRING ACCESS TO DATA

FIELD OF THE INVENTION

The present invention is generally directed to data security and, more specifically, a system that provides for entry point (e.g., pre-firewall) classification of requests that require access to data.

BACKGROUND

Data security in the digital age is a constant concern. Unfortunately, data breaches, in which an unauthorized entity retrieves, accesses or otherwise views data are becoming more common place. Many of these data breaches involve personal data associated with individuals, such as names, addresses, telephone numbers, account numbers, government-issued identifiers and the like. When such data is in the wrongful possession of an unauthorized entity, the individual associated with the data is exposed to various risks, such as, having their identity and/or financial resources misappropriated.

As a means of trying to protect against such data breaches, governments and other regulatory entities have recently initiated stringent regulations for protecting personal data which require adherence by entities that possess such data. For example, the European Union (EU), has recently established the General Data Protection Regulation (GDPR) on data protection and privacy for all individuals within the EU and additionally addresses the export of personal data outside of the EU. In addition, the GDPR aims primarily to give control to individuals over their personal data.

Many large enterprises, such as retail businesses and financial institutions, are required to possess personal data (i.e., customer data) as a means of conducting business. As such, these enterprises regularly receive requests from the individuals/customers and or third-party entities to access, view, delete, modify or otherwise use an individual's/customer's personal data. In many instances, once the data requests are received within the large enterprise, the requests are acted upon (i.e., the data is accessed from one or more storage locations and/or different applications are executed to perform the acts associated with the request). However, once the data requests have been received and the acts associated with the request are put into motion, it may be too late to insure that regulations and the like associated with accessing, viewing and/or otherwise using the data are adhered to.

In addition, such data requests may be received from a myriad of different request channels, such as email, online entry, mobile application submission, voice call/mail, in person at a place of business and the like. Each of the data request channels may process data requests differently and, as a result, lead to inconsistencies in how requests associated with data requiring special handling (i.e., regulated data owners and/or data) are processed.

Therefore, a need exists to develop systems, apparatus, methods or the like for classifying requests associated with personal data. In this regard, the desired system, apparatus, methods or the like should be capable of determining whether a request associated with personal data requires classification and, in response, determining and assigning the appropriate classification. In response to assigning the classification the request, the request is routed based on the assigned classification (e.g., routed to a special processing queue or the like). The classification should occur at or before a point of entry, such that the classification of the request occurs before any downstream processing occurs based on the request. Moreover, the desired systems, apparatus, methods and the like should classify requests consistently regardless of which different request channel receives the request.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, apparatus, methods and/or the like for classifying requests associated with personal data. The invention provides the capability to determine whether a request associated with personal data requires classification (for example, whether the request is impacted by regulations or other requirements necessitating classification/categorization). The determination may be based on what entity is requesting the data, the origin of the request, whose data is being requested, the type of action associated with the request and/or the data elements associated with the request. In addition, once the request has been determined to require classification the classification is determined and assigned to the request. The classification may be determined based on the rules associated with the regulation or other requirement(s) necessitating the classification/categorization. The classification may identify rules for processing the request along with routing for the request (e.g., communicating the request to a predetermined queue designated for specific classification types).

In accordance with embodiments of the invention, the requests are classified at or before a point of entry into the trusted internal computing network of the enterprise. By classifying the requests at or before a point of entry the present invention is able to insure that those requests requiring special handling are processed as such upon entry into the enterprise's trusted internal computing network. For example, digital requests that are communicated to the enterprise via the Internet are classified in-line with or pre-firewall, and telephone requests are intercepted during the call for classification purposes.

Moreover, the present invention is capable of classifying requests received from any data request channel, including but not limited to, digital requests (e.g., email), online entries, mobile application submissions, voice call/mail, in person requests and the like.

In specific embodiments of the invention, machine-learning processing is implemented to progressively learn, over-time, which data requests require classifications. In addition, the machine-learning processing may be further implemented to progressively learn, over-time, which classification should be assigned to the data requests.

A system for data security defines first embodiments of the invention. The system includes a trusted internal computing network and a computing platform including a memory and at least one processor in communication with the memory. The memory stores instructions that are executable by the at least processor. The instructions are configured to receive a request that requires access to data stored within the trusted internal computing network. In response to receiving the request, the instructions are configured to determine (i) an entity associated with the request, (ii) an origin associated with the entity, (iii) one or more entities associated with the data being accessed (iv) a one or more types of action associated with the request, and/or (v) one or more data elements that are required to be accessed based on the request. In response to determining one or more of the aforementioned data security parameters, the instructions are configured to determine and assign a data security classification to the request based on at least one of the aforementioned data security parameters. In response to assigning the response the data security classification, the instructions are further configured to route the request in accordance with the assigned data security classification.

In specific embodiments the system further includes a firewall that monitors and controls network traffic (i) inbound to the trusted internal computing network from an untrusted external computing network, and (ii) outbound from the trusted internal computing network to the untrusted external computing network based on predetermined security rules. In such embodiments of the system the instructions are executed prior to or in-line with the firewall monitoring and controlling the network traffic.

In further specific embodiments of the system, the instructions further include machine learning instructions configured to progressively learn information including ((i) an entity associated with the request, (ii) an origin associated with the entity, (iii) one or more entities associated with the data being accessed (iv) a one or more types of action associated with the request, and/or (v) one or more data elements that are required to be accessed based on the request. In such embodiments of the system, the instructions are further configured to determine ((i) an entity associated with the request, (ii) an origin associated with the entity, (iii) one or more entities associated with the data being accessed (iv) a one or more types of action associated with the request, and/or (v) one or more data elements that are required to be accessed based on the request based on the information learned by the machine learning instructions.

In further related embodiments of the system, the machine learning instructions are further configured to progressively learn data security classifications to assign to a request based on previous execution of the machine learning instructions. In such embodiments of the system, the instructions are further configured to determine the data security classification by predicting the data security classification based on (i) the learned data security classifications, (ii) metadata included in the request, and/or (iii) composite metadata compiled within the trusted internal computing network.

In further specific embodiments of the system, the instructions are further configured to receive the request by intercepting a voice call in which a caller provides the request. In such embodiments of the system, the instructions are further configured to determine the data security parameters by (a) inputs provided by the caller during the voice call, (b) voice analysis processing, (c) a call origin location, and/or (d) machine learning processing.

In yet other specific embodiments of the system, the instructions are further configured to route the request to a classification-specific response processing queue. In other related embodiments of the system, the instructions further include machine learning instructions configured to progressively learn routing information based on previous requests processed by the instructions. In such embodiments of the system, the instructions are further configured to determine a routing for the request based on the learned routing information. In other related embodiments of the system, the instructions are further configured to respond to the request by accessing a source of truth database to retrieve verified data elements associated with performing the request.

Moreover, in further embodiments of the system, the instructions are further configured to receive the request from an entity external to the trusted internal computing network or from an entity internal to the trusted internal computing network.

An apparatus configured for data security defines second embodiments of the system. The apparatus includes a computing platform having a memory and at least one processor in communication with the memory. The memory stores instructions that are executable by the at least processor. The instructions are configured to receive a request that requires access to data stored within the trusted internal computing network. In response to receiving the request the instructions are configured to determine (i) an entity associated with the request, (ii) an origin associated with the entity, (iii) one or more entities associated with the data being accessed (iv) a one or more types of action associated with the request, and/or (v) one or more data elements that are required to be accessed based on the request. In response to determining the aforementioned data security parameters the instructions are further configured to determine and assign a data security classification to the request based one or more of the aforementioned data security parameters. In response to assigning the request a data security classification, the instructions are configured to route the request in accordance with the assigned data security classification.

In specific embodiments of the apparatus, the instructions are executed prior to or in-line with a firewall monitoring and controlling network traffic.

In other specific embodiments of the apparatus, the instructions further include machine learning instructions configured to progressively learn information including ((i) an entity associated with the request, (ii) an origin associated with the entity, (iii) one or more entities associated with the data being accessed (iv) a one or more types of action associated with the request, and/or (v) one or more data elements that are required to be accessed based on the request based on previous execution of the machine learning instructions. In such embodiments of the apparatus, the instructions are further configured to determine (i) an entity associated with the request, (ii) an origin associated with the entity, (iii) one or more entities associated with the data being accessed (iv) a one or more types of action associated with the request, and/or (v) one or more data elements that are required to be accessed based on the request based on the information learned by the machine learning instructions.

In yet other specific embodiments of the apparatus, the instructions further include machine learning instructions configured to progressively learn data security classifications to assign to a request based on previous execution of the machine learning instructions. Moreover, the instructions are further configured to determine the data security classification by predicting the data security classification based on (i) the learned data security classifications, (ii) metadata included in the request, and/or (iii) composite metadata compiled within the trusted internal computing network.

A computer-implemented method for providing data security defines third embodiments of the invention. The computer-implemented method is implemented by one or more processing devices. The method includes receiving a request that requires access to data stored within the trusted internal computing network. In response to receiving the request the method further includes determining (i) an entity associated with the request, (ii) an origin associated with the entity, (iii) one or more entities associated with the data being accessed (iv) a one or more types of action associated with the request, and/or (v) one or more data elements that are required to be accessed based on the request. In response to determining the aforementioned data security parameters, the method includes determining and assigning a data security classification to the request based on (i) an entity associated with the request, (ii) an origin associated with the entity, (iii) one or more entities associated with the data being accessed (iv) a one or more types of action associated with the request, and/or (v) one or more data elements that are required to be accessed based on the request. In response to assigning the data security classification the method includes routing the request in accordance with the assigned data security classification.

In specific embodiments of the method the instructions are executed prior to or in-line with a firewall monitoring and controlling network traffic.

Thus, according to embodiments of the invention, which will be discussed in greater detail below, the present invention provides for end-to-end automated performance of actions in response to receiving unstructured data from one of a plurality of action request channels and/or applications. The centralized/single engine approach of the present invention means that results are consistent and reliable regardless of which channel/application initiated the request and/or which entity the request is associated with. Consistency in results is realized by structuring the unstructured data and extracting data elements therefrom that provide for determination of a predetermined action categories/classifications. The action categories/classifications define the automated processes, flows and/or tools required to complete the action.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
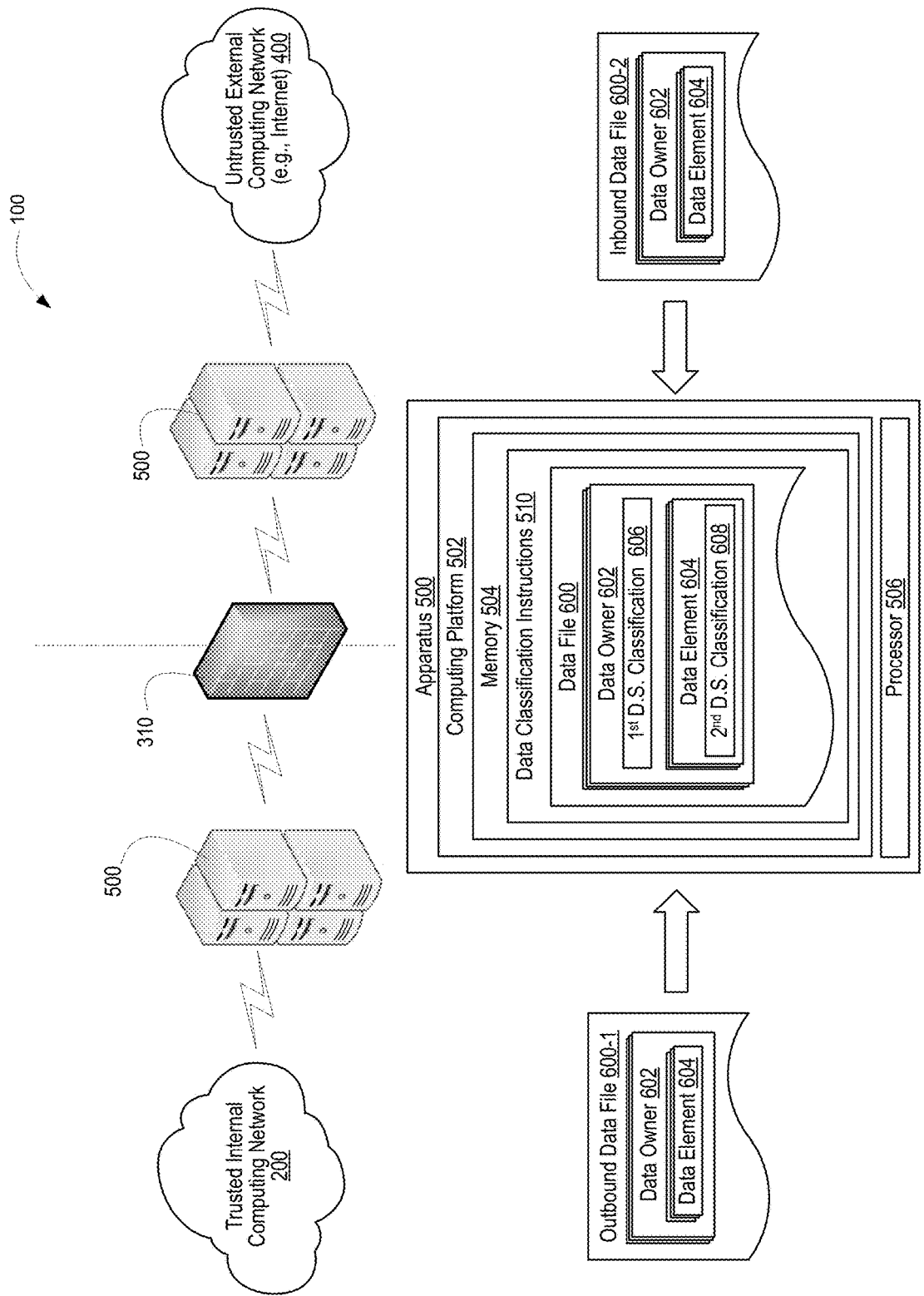
Figure 2:
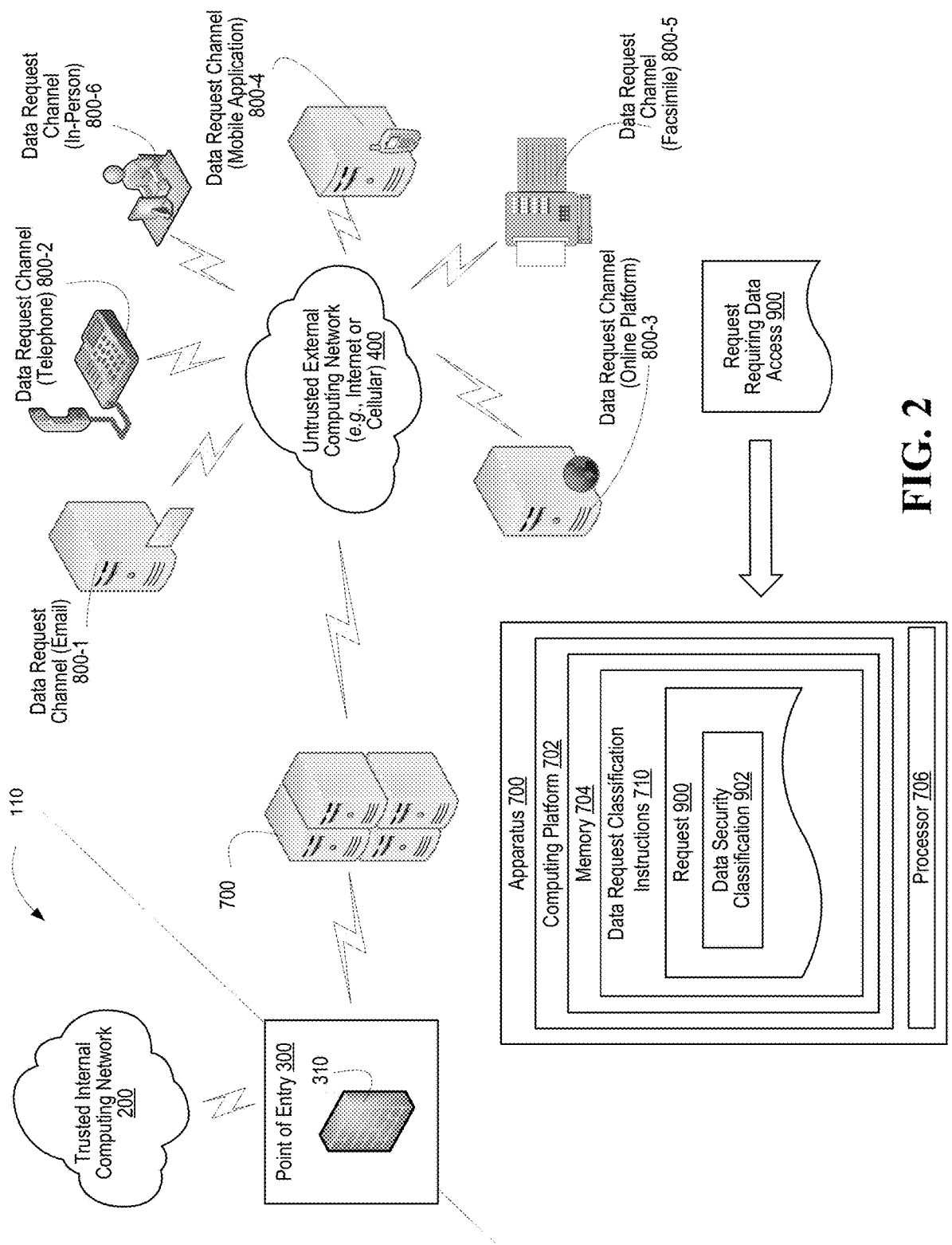
Figure 3:
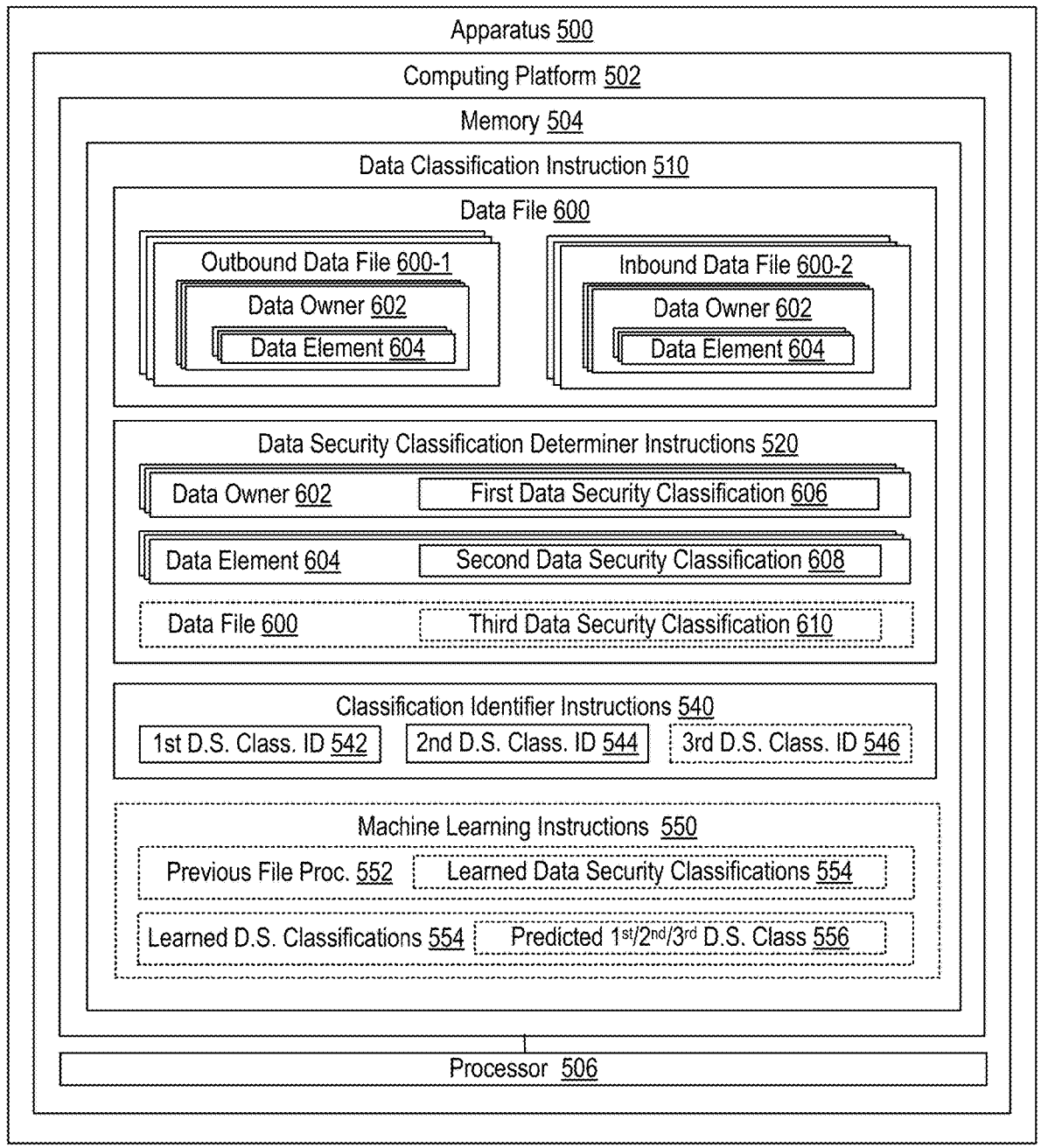
Figure 4:
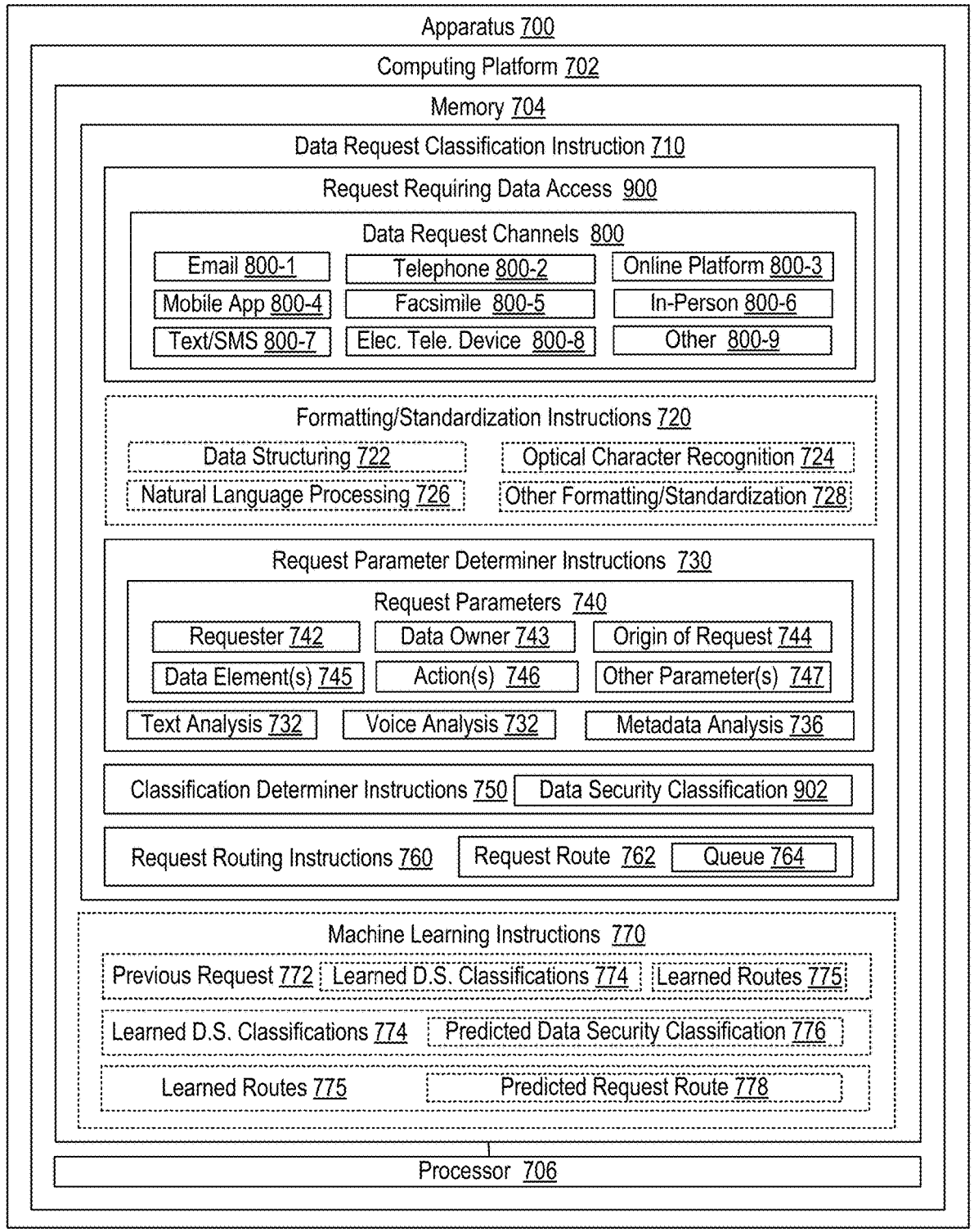
Figure 5:
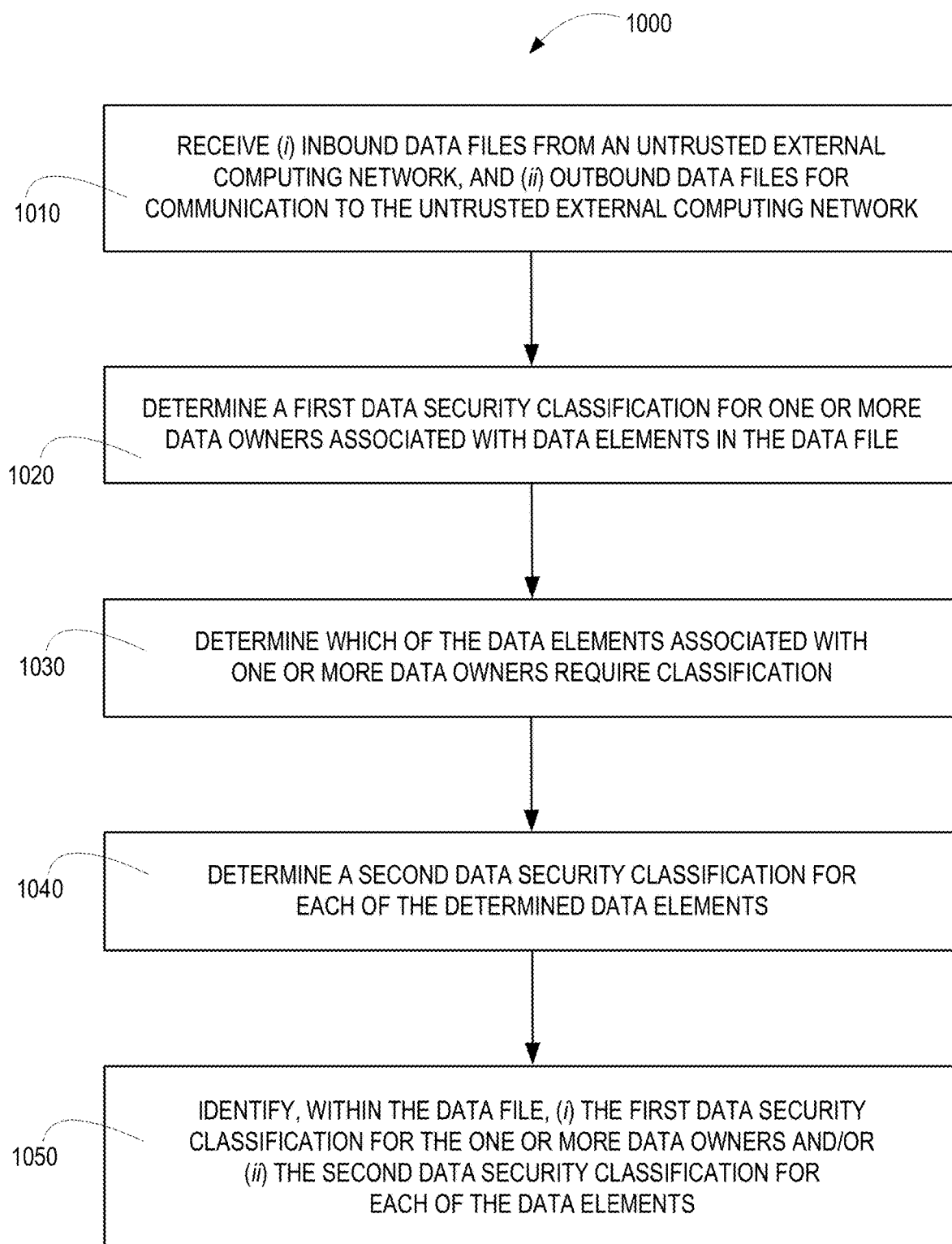
Figure 6:
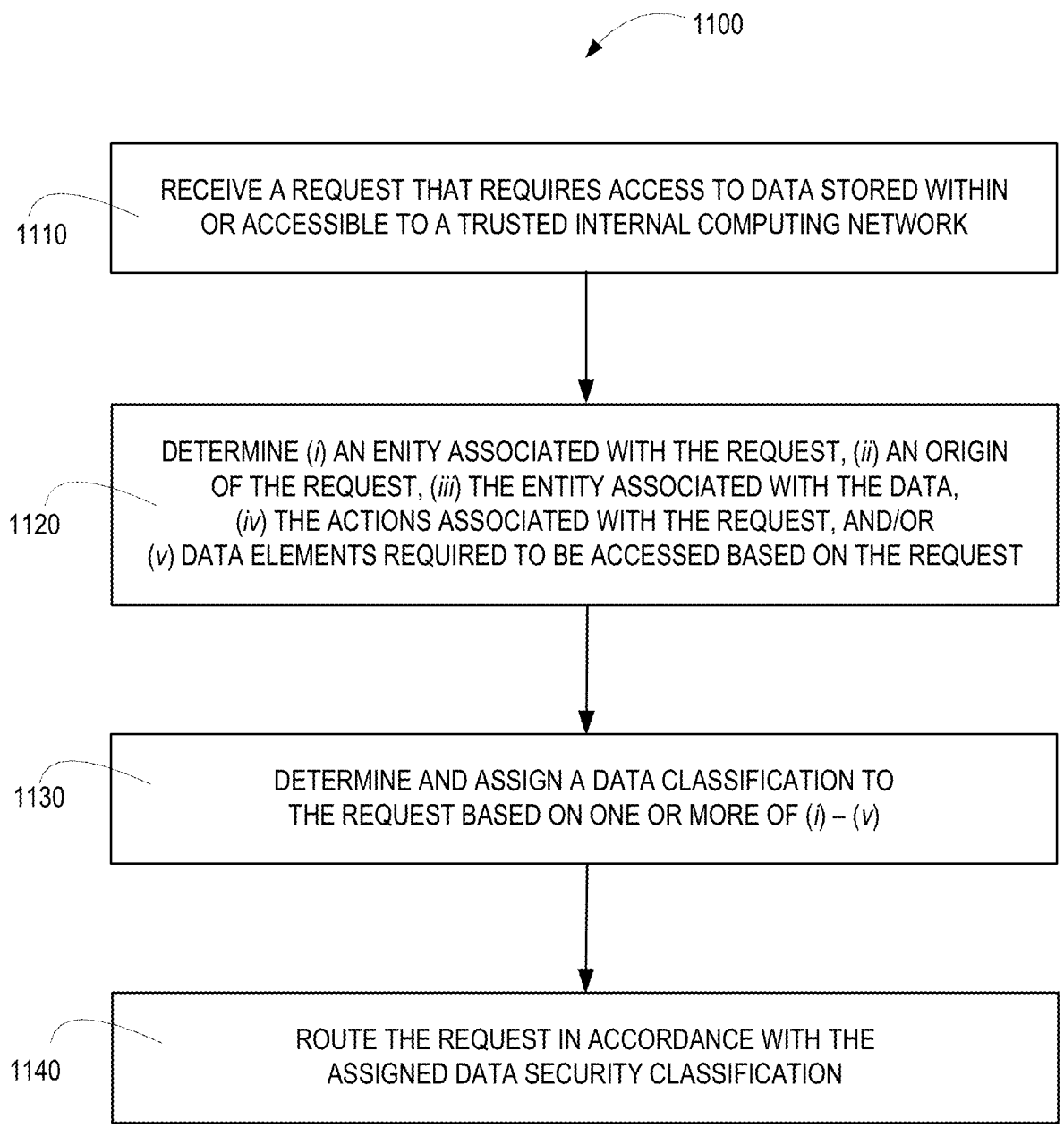

Having thus described embodiments of the disclosure in general terms, reference will now be made to the accompanying drawings, wherein:

FIG. 1 is a schematic diagram of a system for classifying data owners and/or data elements in incoming or outgoing data files in-line or pre-firewall, in accordance with some embodiments of the present disclosure;

FIG. 2 is a schematic diagram of a system for classifying data requests at or before a data request entry point, in accordance with embodiments of the present invention;

FIG. 3 is a block diagram of an apparatus for classifying data owners and/or data elements in incoming or outgoing data files in-line or pre-firewall, in accordance with some embodiments of the present disclosure;

FIG. 4 is a block diagram of an apparatus for classifying data requests at or before a data request entry point, in accordance with embodiments of the present invention;

FIG. 5 is a flow diagram of a method for classifying data owners and/or data elements in incoming or outgoing data files in-line or pre-firewall, in accordance with embodiments of the present invention; and FIG. 6 is a flow diagram of a method for classifying data requests at or before a data request entry point, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, systems, apparatus, and methods are described in detail below for end-to-end automated performance of actions, otherwise referred to as events, tasks, jobs or the like as a result of receiving unstructured action request data from different action request channels and/or applications. The unstructured data may include, but is not limited to, text data (e.g., electronic mail, word processing document, image file/document), audio data (e.g., recording voice file), video/multimedia data (e.g., recording video/multimedia file) and the like. The action request channels may include, but are not limited to, electronic mail, online platform/website, mobile application, facsimile, kiosk (e.g., automated teller machine), audio and/or video call center (e.g., IVR or the like) or the like.

The present invention is implemented as a service and, as such, an enterprise implementing the service is able to process action requests, regardless of which division, unit, Line of Business (LOB), or the like within the enterprise initiates the action request and/or which channel/application the action request is received from. Moreover, the centralized/single engine approach of the present invention means that results are consistent and reliable regardless of which channel/application initiated the request and/or which unit/division within the enterprise the request is associated with.

The present invention relies on structuring the unstructured data and, subsequently extracting data elements from the structured data to determine one or more action categories, otherwise referred to as action classifications or classifications from amongst a plurality of predetermined action categories/classifications. By categorizing the action request in accordance with predetermined action categories/classifications the present invention insures that the process, work flow and/or tools used to perform the action are consistent and, thus, so too is the result.

Turning now to the figures, FIG. 1 is a schematic/block diagram of an exemplary system 100 for data security and, more specification, a system for classifying data owners and/or data elements in data file being communication prior to or in-line with a firewall, in accordance with embodiments of the present invention. The system 100 includes a trusted internal computing network 200, such as an intranet within an enterprise or the like. The system additionally includes a firewall 310 that is the gateway between the trusted internal computing network 200 and the untrusted external computing network 400, such as the Internet or the like. The firewall is configured to monitor and control network traffic. The network traffic includes (i) inbound network traffic from an untrusted external computing network 400 to the trusted internal computing network 200, and (ii) outbound network traffic from the trusted internal computing network 200 to the untrusted external computing network 400. The network traffic includes data files 600 that includes a plurality of data elements 604, which may be associated with a data owner 602. The data owner 602, as used herein, is the individual or entity that is associated with or possesses a data element 604 (e.g., an individual or entity (i.e., data owner) is associated with/possesses an address, a telephone number, an account number, social security number or the like). In large enterprises, such as financial institutions, retailers or the like, such data files are communicated between such enterprises on a regular and ongoing basis.

The system 100 additionally includes an apparatus 500 that is configured to classify/categorize data owners 602 and/or data elements 604 in the data file 600 prior to or in-line with the firewall 310. Similar to intrusion protection, which provides for an enterprise to detect and deny entities, such as hackers or the like from entering their trusted internal computing network, the present invention provides for data protection (i.e., data or data owners that require classification/categorization is performed before the data (i) enters the trusted internal computing network 200 from the untrusted external computing network 400, and/or (ii) exits the internal computing network 200 to the untrusted external computing network 400. Such classification/categorization of data requiring such classification/categorization at the point of entry (i.e., in-line with or prior to the firewall 310) adds a level of assurance that once the data enters and/or exits the trusted internal computing network, the data is accessed/stored or meets or other criteria associated with the classification/categorization regardless of which internal application/system receives the data and/or which external entity receives the data.

As such, apparatus 500 which may comprise one or more computing devices, such as servers or the like, may be in direct communication with the firewall 310. In specific embodiments of the invention (as shown in FIG. 1), the apparatus 500 comprising multiple computing devices may be positioned on both sides of the firewall so as to accommodate both outbound data files 600-1 and inbound data files 600-2. In other embodiments of the invention, the apparatus 500 may be positioned within the untrusted external computing network 400 (or between the untrusted external computing network 400 and the firewall 310) to allow for the classification/categorization of categorize data owners 602 and/or data elements 604 in the inbound data files 600-2 and the outbound data files 600-1. In other embodiments of the invention, the functionality embodied in apparatus 500 may be performed in-line with the firewall 310. In such embodiments of the invention, apparatus 500 may be positioned in parallel with the firewall 310 or the functionality of apparatus 500 may be included in the computing devices comprising the firewall 310 (thus, obviating the need for apparatus 500).

The apparatus 500 includes a computing platform 502 having a memory 504 and a processor 506 in communication with the memory 504. The memory 504 stores data classification instructions 510, which are executable by the processor 506. The data classification instructions 510 are configured to receive the outbound data files 600-1 and the inbound data files 600-2.

The data classification instructions are further configured to determine a first data security classification 606 for one or more of the data owners 602 associated with data elements 604 in the received data files 600. In this regard, the instructions 510 are configured to identify which data owners 602 have data elements 604 in the data file and, once the data owners 602 have been identified, determine which data owners 602 are subject to a data security classification/categorization. In this regard, not all of the data owners 602 having data elements 604 in a specific data file 600 may be subject to classification/categorization. For example, only data owners that fall within a specific government regulatory standard and/or meet internal classification/categorization guidelines will require classification/categorization. Data owners 602 may be identified by verifying one or more identifying data elements 604 in the data file 600, such as name, address, telephone number, account number or the like. Verification may provide for comparing the data elements 604 in the data file 600 to a source of truth, such as database that federates data owners based on previously verified data owner identifying data, such as verified, name, address, telephone number or the like account number.

In response to identifying the data owners, the instructions 510 determine which of the identified data owners 602 require the first data security classification 606 and determine which first data security classification 606 to assign those data owners 602. In specific embodiments of the system, such determinations may be made by accessing a database that lists data owners requiring the first data security classification 606 and the first data security classification(s) 606 to be assigned to those data owners 602.

In other embodiments of the system, machine learning instructions (shown and discussed in greater detail with regards to FIG. 3) are included within instructions 510. Machine learning instructions provide for progressively learning, based on data files 600 previously processed by the data classification instructions 510, which data owners 602 require first data security classification 606 and/or the first data security classification 606 to assign to the those data owners 602. In such embodiments of the invention, subsequent determination by the instructions 510 as to which data owners require the first data security classification and which classification to assign may be a prediction based on the data learned by the machine learning instructions, as well as, in some embodiments other data that heighten the accuracy of the prediction, such as metadata associated with the data file 600 and/or internally-accessible collaborative metadata collected over time from various metadata sources.

The data classification instructions are further configured to determine which of the data elements 604 associated the identified data 602 owners require second data security 608 classification and, in response, determine one or more second data security classifications 608 for each of the determined data elements 604. It should be noted that in most instances, the need for timely and efficient data file communication and processing speed limitations, make it impractical to classify/categorize all the data owners 602 and/or data elements 604 in each data file 600. The present invention addresses this concern by only classifying/categorizing those data owners 602 and/or data elements 604 that fall within a specific government regulatory standard and/or meet internal classification/categorization guidelines. In specific embodiments of the system, such determinations may be made by accessing a database that lists data elements requiring the second data security classification 608 and the second data security classification(s) 608 to be assigned to those data elements 604.

As previously discussed, in other embodiments of the system, machine learning instructions are included within instructions 510. Machine learning instructions provide for progressively learning, based on data files 600 previously processed by the data classification instructions 510, which data elements 604 require second data security classification 608 and/or the second data security classification 608 to assign to the those data elements 604. In such embodiments of the invention, subsequent determination by the instructions 510 as to which data elements require the second data security classification 608 and which classification 608 to assign to the data element 604 may be a prediction based on the data learned by the machine learning instructions, as well as, in some embodiments other data that heighten the accuracy of the prediction, such as metadata associated with the data file 600 or data elements 604 and/or internally-accessible collaborative metadata collected over time from various metadata sources.

In response to determining the data security classifications 606 and/or 608, the instructions 510 are configured to identify, within the data file, the first and/or second data security classification 606 and/or 608. In specific embodiments of the system 100, tags or the like may be attached to the data file and/or the data elements to identify the first and/or second data security classifications 606 and/or 608. In other embodiments of the system 100, additional fields may be added to the data file 600 with the additional fields identifying the first and/or second data security classifications 606 and/or 608. As previously discussed by providing identification of the first and/or second data security classifications 606 and/or 608 within the data file 600-2 prior to or in-line with firewall processing, the present invention insures that any classified data within an incoming data file is properly identified so that any application or database that comes in contact with the data is aware that the data is classified and, as such, special access, usage and/or storage requirements associated with the classification are to be to adhered to. In addition, the present invention insures that any classified data within an outgoing data file 600-1 is properly identified so that any entity/system within the untrusted external computing network 400 that receives the data file is aware that the data is classified and, as such, special access, usage and/or storage requirements associated with the classification should apply.

Referring to FIG. 2 a schematic/block diagram is presented of a system 110 for data security and, more specifically, a system 110 for classifying/categorizing requests that require access to classified/categorized data, in accordance with embodiments of the invention. The system 100 includes a trusted internal computing network 200, such as an intranet within an enterprise or the like. The system additionally includes a point of entry 300 to the trusted internal computing network 200. In specific embodiments of the system, the point of entry 300 is a firewall 310 that is the gateway between the trusted internal computing network 200 and the untrusted external computing network 400, such as the Internet or the like. The firewall is configured to monitor and control network traffic. The network traffic includes (i) inbound network traffic from an untrusted external computing network 400 to the trusted internal computing network 200, and (ii) outbound network traffic from the trusted internal computing network 200 to the untrusted external computing network 400.

The system 110 additionally includes an apparatus 700 that is configured to classify/categorize requests 900 requiring access to data prior to or in-line with the point of entry 300, in accordance with embodiments of the present invention. Such classification/categorization of requests requiring access to data at or just prior to the point of entry (e.g., in-line with or prior to the firewall 310) adds a level of assurance that once the request enters the trusted internal computing network, the request is processed in accordance with internal or external rules governing the data requester, the data owner and/or the data being accessed. The data owner, as previously discussed, is the individual or entity that is associated with or possesses the data being requested (e.g., an individual or entity associated with an address, a telephone number, an account number, social security number or the like).

Apparatus 700 which may comprise one or more computing devices, such as servers or the like, may be in direct communication with the point of entry 300. In specific embodiments of the invention (as shown in FIG. 2), the apparatus 700 may be positioned within the untrusted external computing network 400 (or between the untrusted external computing network 400 and the firewall 310) to allow for the classification/categorization of requests 900 prior to the point of entry 300. In other embodiments of the invention, the functionality embodied in apparatus 700 may be performed in-line with functionality performed at the point of entry 300. In such embodiments of the invention, apparatus 700 may be positioned in parallel with the point of entry 300 or the functionality of apparatus 700 may be included in the computing devices comprising the point of entry 300 (thus, obviating the need for apparatus 700).

The apparatus 700 includes a computing platform 702 having a memory 704 and a processor 706 in communication with the memory 704. The memory 704 stores data request classification instructions 710, which are executable by the processor 706. The data classification instructions 710 are configured to receive the requests 900 that require access to data stored within (or accessible to) the trusted internal computing network 200. The request may be any request that requires access to data, referred to herein as an "action", such as but not limited to, a request to access/view data, a request to change data, a request to delete data, a request to use data, or the like. The request 900 may be received from any one of a plurality of different data request channels 800 which are in communication with the untrusted external communication network 400, such as the Internet and/or a cellular communication network. As shown in FIG. 2, the data request channels 800 may include, but are not limited to, electronic mail (email) 800-1, telephone 800-2, online platform 800-3, mobile application 800-4, facsimile 800-5, in-person 800-6 and the like. It should further be noted that requests requiring access to data may come from the data owner or a third-party entity that is otherwise authorized to access one or more data owner's data.

The data request classification instructions 710 are further configured to determine at least one request classification parameters. The request classification parameters may include one or more of (i) an entity making the request, (ii) an origin (location from which the request originates) associated with the request, (iii) the data owner(s) whose data is being accessed, (iv) one or more actions associated with the request, and/or (v) the data elements (i.e., specific data) that is required to be accessed based on the request. The determination may be made from the request itself or data associated with the request (e.g., metadata, IP address, telephone/facsimile number, or the like). In additional embodiments of the system 110, the determination of one or more of the request classification parameters may be made by accessing, within the trusted internal computing network 200, the untrusted external computing network 400 or stored locally within the apparatus 700, a source of truth, such as a database that federates data owners based on previously verified data owner identifying data, such as, but not limited to, verified, name, address, telephone number account number or the like. In further embodiments of the invention, the determination of one or more of the request classification parameters may be made by accessing within the trusted internal computing network 200, the untrusted external computing network 400 or stored locally within the apparatus 700, a collaborative metadata database that includes metadata collected over time from various metadata sources.

In response to determining one or more of the request classification parameters, the instructions 712 determine which request data security classification 902 to assign to the request based on at least one of (i) an entity making the request, (ii) an origin (location from which the request originates) associated with the request, (iii) the data owner(s) whose data is being accessed, (iv) one or more actions associated with the request, and/or (v) the data elements (i.e., specific data) that is required to be accessed based on the request. In specific embodiments of the system 110, such determinations may be made by accessing a database that lists data owners requiring the data security classification and the data security classification(s) associated with those data owners. In other embodiments of the system 110, a rules-based engine is implemented to determine which classification rules (and, thus which data security classification) apply to (i) an entity making the request, (ii) an origin (location from which the request originates) associated with the request, (iii) the data owner(s) whose data is being accessed, (iv) one or more actions associated with the request, and/or (v) the data elements (i.e., specific data) that is required to be accessed based on the request.

In other embodiments of the system 110, machine learning instructions (shown and discussed in greater detail with regards to FIG. 4) are included within instructions 710. Machine learning instructions provide for progressively learning, based on requests 900 previously processed by the data request classification instructions 710, which requests require data security classification 902 and/or the data security classification 902 to assign to the request 900. In such embodiments of the invention, the determination by the instructions 902 as to which data security classification 902 to assign may be a prediction based on the data learned by the machine learning instructions, as well as, in some embodiments, other data that heighten the accuracy of the prediction, such as metadata associated with the request 900 and/or an internally-accessible collaborative metadata collected over time from various metadata sources.

Moreover, the data request classification instructions 710 are further configured to route the request in accordance with the assigned data security classification 902. In specific embodiments of the system 110, the request 900 is routed to a classification-specific queue, which insures that the request is properly handled (i.e., that the request requiring access to data, complies with any internal or external regulations/rules pertaining to the access of data).

Referring to FIG. 3 a block diagram of an apparatus 500 configured to provide for classification/categorization of data owners and/or data elements within data files being communicated to and from a trusted internal computing system, in accordance with embodiments of the present invention. In addition to providing greater detail, FIG. 3 highlights various alternate embodiments of the apparatus shown and described in relation to FIG. 1. As previously discussed, the apparatus 500 may include one or multiple different computing devices, such as servers or the like. The apparatus 500 includes a computing platform 502 that includes a memory 504 and at least one processor 506 in communication with the memory 504.

The memory 504 may comprise volatile and non-volatile memory, such as read-only and/or random-access memory (RAM and ROM), EPROM, EEPROM, flash cards, or any memory common to computing platforms. Moreover, memory 504 may comprise cloud storage, such as provided by a cloud storage service and/or a cloud connection service. Processor 506 may be an application-specific integrated circuit ("ASIC"), or other chipset, logic circuit, or other data processing device. Processor 506 may execute one or more application programming interface (APIs) (not shown in FIG. 3) that interfaces with any resident instructions, such as data classification instructions 510. Processor 506 may include various processing subsystems (not shown in FIG. 3) embodied in hardware, firmware, software, and combinations thereof, that enable the functionality of computing platform 502 and the operability of the computing platform 502 on a distributed communication network that provides for communication of data files 600 from and to the trusted internal computing network 200.

Memory 504 of computing platform 502 stores data classification instructions 510 that are configured to classify/categorize data owners and/or data elements in data files being communicated to and from a trusted internal computing network, in accordance with embodiments of the present invention. As previously discussed, the instructions 510 are configured to executed immediately prior to or in-line with a firewall to insure that the proper classification/categorization for data owners and/or data elements is identified before an inbound data file enters the trusted internal computing network or before an outbound data file exits the trusted internal computing network. The instructions 510 includes instructions configured to receive, or otherwise intercept, data files 600 including outbound data files 600-1 being communicated from the trusted internal computing network to the untrusted external computing network and inbound data files 600-1 being communicated from the untrusted external computing network to trusted internal the computing network. As previously described, the data files 600 include one or more data elements 604, which are typically associated with a data owner 602. The data owner 602, as used herein, is the individual or entity that is associated with or possesses a data element 604 (e.g., an individual or entity (i.e., data owner) is associated with/possesses an address, a telephone number, an account number, social security number or the like). In large enterprises, such as financial institutions, retailers or the like, data files containing data owner information are communicated between such enterprises on a regular and ongoing basis.

The instructions 510 include data security classification determiner instructions 520 configured to determine a first data security classification 606 for one or more of the data owners 602 associated with data elements 604 in the received data files 600. In this regard, the instructions 510 are configured to identify which data owners 602 have data elements 604 in the data file and, once the data owners 602 have been identified, determine which data owners 602 are subject to a data security classification/categorization. As previously discussed, not all of the data owners 602 having data elements 604 in a specific data file 600 may be subject to classification/categorization. For example, only data owners that fall within a specific government regulatory standard and/or meet internal classification/categorization guidelines will require classification/categorization.

The data owners 602 within the data file may be identified by verifying one or more identifying data elements 604 in the data file 600, such as name, address, telephone number, account number or the like. Verification may provide for comparing the data elements 604 in the data file 600 to a source of truth, such as database that federates data owners based on previously verified data owner identifying data, such as verified, name, address, telephone number or the like account number.

In response to identifying the data owners, the instructions 520 determine which of the identified data owners 602 require the first data security classification 606 and determine which first data security classification 606 to assign those data owners 602. In specific embodiments of the apparatus, such determinations may be made by accessing a database that lists data owners requiring the first data security classification 606 and the first data security classification(s) 606 to be assigned to those data owners 602.

In other embodiments of the system, machine learning instructions 550 are included within instructions 510. Machine learning instructions provide for progressively learning, based on data files previously processed 552 by the data classification instructions 510, which data owners 602 require first data security classification 606 and/or the first data security classification 606 to assign to the those data owners 602 (i.e., learned data security classifications 554). In such embodiments of the invention, subsequent determination by the instructions 520 as to which data owners 602 require the first data security classification 606 and which first data security 606 classification to assign may be a prediction 556 based on the data learned 554 by the machine learning instructions, as well as, in some embodiments other data that heighten the accuracy of the prediction, such as metadata associated with the data file 600 and/or internally-accessible collaborative metadata collected over time from various metadata sources.

The data security classification determiner instructions 520 are further configured to determine which of the data elements 604 associated the identified data 602 owners require second data security 608 classification and, in response, determine one or more second data security classifications 608 for each of the determined data elements 604. As previously noted, the need for timely and efficient data file communication and processing speed limitations, make it impractical to classify/categorize all the data owners 602 and/or data elements 604 in each data file 600. The present invention addresses this concern by only classifying/categorizing those data owners 602 and/or data elements 604 that require such (i.e., fall within a specific government regulatory standard and/or meet internal classification/categorization guidelines). In specific embodiments of the apparatus 500, such determinations may be made by accessing a database that lists data elements 604 requiring the second data security classification 608 and the second data security classification(s) 608 to be assigned to those data elements 604.

In other embodiments of the apparatus, the machine learning instructions 550 are configured to progressively learn, based on data files previously processed 552 by the data classification instructions 510, which data elements 604 require second data security classification 608 and/or the second data security classification 608 to assign to the those data elements 604 (i.e., learned data security classifications 554). In such embodiments of the invention, subsequent determination as to which data elements require the second data security classification 608 and which classification 608 to assign to the data element 604 may be a prediction 556 based on the data learned 554 by the machine learning instructions, as well as, in some embodiments other data that heighten the accuracy of the prediction, such as metadata associated with the data file 600 or data elements 604 and/or internally-accessible collaborative metadata collected over time from various metadata sources.

In alternate embodiments of the invention, the data security classification determiner instructions 520 are configured to determine if the data file itself requires classification/categorization and, in response, determine one or more third data security classifications 610 for the data file 600. The data file 600 itself may be determined to require classification/categorization based on the overall topic of the data file or the contents of the data file. For example, if the data file is limited to data owners from a particular location/country that are subject to a government issued regulation on data security (e.g., GDPR or the like) the entire data file may be classified/categorized. In specific embodiments of the apparatus 500, such determinations may be made by accessing a database that lists the topics/requirements of data files requiring third data security classification 610 and the third data security classification(s) 610 to be assigned to those data files 610. In specific embodiments, the machine learning instructions 550 are configured to progressively learn, based on data files previously processed 552 by the data classification instructions 510, which data files 600 require third data security classification 610 and/or the third data security classification 610 to assign to the those data files 604 (i.e., learned data security classifications 554). In such embodiments of the invention, subsequent determination as to which data files require the third data security classification 610 and which third data security classification 610 to assign to the data file 600 may be a prediction 556 based on the data learned 554 by the machine learning instructions, as well as, in some embodiments other data that heighten the accuracy of the prediction, such as metadata associated with the data file 600 and/or the internally-accessible collaborative metadata.

In response to determining the data security classifications 606, 608 and/or 610, the classification identifier instructions 540 are configured to identify, within the data file, the first, second and/or third data security classification 606, 608 and/or 610. In specific embodiments of the system 100, tags or the like may be attached to the data file and/or the data elements to identify the first, second and/or third data security classifications 606, 608 and/or 610. In other embodiments of the system 100, additional fields may be added to the data file 600 with the additional fields identifying the first, second and/or third data security classifications 606, 608 and/or 610. As previously discussed by providing identification of the first, second and/or third data security classifications 606, 608 and/or 610 within the data file 600-2 prior to or in-line with firewall processing, the present invention insures that any classified data within an inbound data file 600-2 is properly identified so that any application or database that comes in contact with the data is aware that the data is classified and, as such, special access, usage and/or storage requirements associated with the classification are to be to adhered to. In addition, the present invention insures that any classified data within an outgoing data file 600-1 is properly identified so that any entity/system within the untrusted external computing network 400 that receives the data file is aware that the data is classified/categorized and, as such, special access, usage and/or storage requirements associated with the classification should apply.

Referring to FIG. 4 a block diagram of an apparatus 700 configured to provide for classification/categorization of requests requiring access to data, in accordance with embodiments of the present invention. In addition to providing greater detail, FIG. 4 highlights various alternate embodiments of the apparatus shown and described in relation to FIG. 2. As previously discussed, the apparatus 700 may include one or multiple different computing devices, such as servers or the like. The apparatus 700 includes a computing platform 702 that includes a memory 704 and at least one processor 706 in communication with the memory 704.

The memory 704 may comprise volatile and non-volatile memory, such as read-only and/or random-access memory (RAM and ROM), EPROM, EEPROM, flash cards, or any memory common to computing platforms. Moreover, memory 704 may comprise cloud storage, such as provided by a cloud storage service and/or a cloud connection service. Processor 706 may be an application-specific integrated circuit ("ASIC"), or other chipset, logic circuit, or other data processing device. Processor 706 may execute one or more application programming interface (APIs) (not shown in FIG. 4) that interfaces with any resident instructions, such as data request classification instructions 710. Processor 506 may include various processing subsystems (not shown in FIG. 4) embodied in hardware, firmware, software, and combinations thereof, that enable the functionality of computing platform 702 and the operability of the computing platform 702 on a distributed communication network that provides for communication of the requests 900 to the trusted internal computing network 200.

The memory 704 of apparatus 700 stored data request classification instructions 710 that are configured to determine a classification/categorization for a request requiring access to data, in accordance with embodiments of the present invention. The classification/categorization occurs immediately prior to or on-line with a point of entry (e.g., a firewall) to a trusted internal computing network. The instructions are configured to receive, or otherwise intercept, requests requiring access to data associated with a data owner (e.g., personal data, such as name, address, telephone number, account number/information, social security number and the like). The request may be received from various different data requests channels 800. The data request channels may include, but are not limited to, email 800-1, telephone 800-2, online platform 800-3, mobile application 8004, facsimile 800-5, in-person 800-6, text/SMS 800-7, electronic telecommunications device (e.g., Automated Teller Machine) 800-8 and any other channel 800-9 capable of communicating requests 900.

In specific embodiments of the apparatus 700, the instructions 710 include formatting/standardization instructions 720 configured to properly format the requests 900 for subsequent analysis. Formatting and standardization is needed to accommodate the various different data request channels that provide for the requests to be received in different formats, such as text/word format, audio format and the like. The formatting/standardization instructions 720 may include, but is not limited to, data structuring instructions 722, Optical Character Recognition (OCR) instructions 724, Natural Language Processing (NLP) instructions 726 and other formatting and standardization 728, such as voice-to-text or the like.

The instructions 720 further include request parameter determiner instructions 730, which are configured to determine/identify one or more request parameters including, but not limited to, the requester 742, the data owner 743, the origin of the request 744 (location from which the request originates), data elements 745 required to be accessed, one or more actions 746 associated with the request, and/or other parameters 747 associated with the request. In this regard, the instructions 730 may include text analysis instructions 732, voice analysis instructions 732 and metadata analysis instructions 736 configured to analyze the request and determine any one of the aforementioned request parameters. The determination may be made from the request itself or data associated with the request (e.g., metadata, IP address, telephone/facsimile number, or the like). In additional embodiments of the apparatus 700, the determination of one or more of the request classification parameters may be made by accessing, within the trusted internal computing network 200, the untrusted external computing network 400 or stored locally within the apparatus 700, a source of truth, such as a database that federates data owners based on previously verified data owner identifying data, such as, but not limited to, verified, name, address, telephone number account number or the like. In further embodiments of the invention, the determination of one or more of the request classification parameters may be made by accessing within the trusted internal computing network 200, the untrusted external computing network 400 or stored locally within the apparatus 700, a collaborative metadata database that includes metadata collected over time from various metadata sources.

In response to determining one or more of the request classification parameters, the instructions 710 include data security classification determiner instructions 750 configured to determine which data security classification 902 to assign to the request based on at least one of (i) an entity making the request, (ii) an origin (location from which the request originates) associated with the request, (iii) the data owner(s) whose data is being accessed, (iv) one or more actions associated with the request, and/or (v) the data elements (i.e., specific data) that is required to be accessed based on the request. In specific embodiments of the apparatus 700, such determinations may be made by accessing a database that lists data owners requiring the data security classification and the data security classification(s) associated with those data owners. In other embodiments of the apparatus, a rules-based engine (not shown in FIG. 4) is implemented to determine which classification rules (and, thus which data security classification 902) apply to (i) an entity making the request, (ii) an origin (location from which the request originates) associated with the request, (iii) the data owner(s) whose data is being accessed, (iv) one or more actions associated with the request, and/or (v) the data elements (i.e., specific data) that is required to be accessed based on the request.

In other embodiments of the apparatus 700, machine learning instructions 770 are included within instructions 710. Machine learning instructions 770 provide for progressively learning, based on requests 772 previously processed by the data request classification instructions 710, data security classification 774 to assign to the request 900. In such embodiments of the invention, the determination by the instructions 750 as to which data security classification 902 to assign may be a prediction 776 based on the learned data security classifications 774, as well as, in some embodiments, other data that heighten the accuracy of the prediction, such as metadata associated with the request 900 and/or an internally-accessible collaborative metadata collected over time from various metadata sources.

Moreover, the data request classification instructions 710 further include request routing instructions that are configured to determine a route 762 for the request in accordance with the assigned data security classification 902. In specific embodiments of the apparatus 700, the request route 762 is a classification-specific queue 764, which holds the request for subsequent processing in accordance with the assigned data security classification/categorization (i.e., insuring that the request requiring access to data, complies with any internal or external regulations/rules pertaining to the access of data). In optional embodiments of the apparatus 700, the machine learning instructions 770 provide for progressively learning, based on requests 772 previously processed by the data request classification instructions 710, routes 775 to assign to the request 900. In such embodiments of the invention, the determination by the instructions 750 as to which routes 762 to assign may be a prediction 778 based on the learned routes 775, as well as, in some embodiments, other data that heighten the accuracy of the prediction, such as metadata associated with the request 900 and/or an internally-accessible collaborative metadata collected over time from various metadata sources.

Referring to FIG. 5 a flow diagram is present of a method 1000 for classifying data owners and/or data elements in a data file that is being communicated to or from a trusted internal computing system, in accordance with specific embodiments of the present invention. As previously discussed the method, which is a computer-implemented method executed by one or more processors, is executed immediately prior to or in-line with a firewall.

At Event 1010, inbound data files are received from an untrusted external computing network (e.g., Internet) for communication to a trusted internal computing system (e.g., intranet) and outbound data files are received from the trusted internal computing network for communication to the untrusted external computing network. The data files include data elements associated with data owners (e.g., personal data associated with customers or the like). Such data files are communicated between enterprises, such as financial institutions, retailers and the like on a continuous basis.

At Event 1020, the data file is analyzed to determine a first data security classification for one or more data owners associated with data elements in the data file. Data owners may be subject to a first data security classification based on the location of the data owner (e.g., residing in a location/country with data security regulations or the like), previous data breaches affecting the data owner (e.g., internal data security guidelines or the like). In specific embodiments of the invention, the determination is made by identifying/verifying the data owners and accessing a database or applying a rules-based engine that correlates data owners to a need for first data security classification (e.g., location of data owner, internal status of data owner and the like). In other embodiments of the invention, machine learning processing is implemented to learn, over time, from previously processed data files, which data owners require first data security classification and/or the first data security classification(s) assigned to the data owners that require such. Learned data owners and/or learned first data security classifications may be used to predict which data owners require classification and the first data security classification to assign to those data owners.

At Event 1030, a determination is made as to which data elements associated with the data owner are subject to or require second data security classification. In specific embodiments of the invention, such a determination is made by identifying those data elements associated with the data owners and accessing a database or applying a rules-based engine that correlates data owner-specific data elements to rules and/or regulations regarding the need for special handling/storage of the identified data elements.

At Event 1040, once the data elements have been identified, a determination is made as to which classification(s) to assign to the data elements. In specific embodiments of the invention, the determination is made by accessing a database or applying a rules-based engine that correlates data owner-specific data elements to rules and/or regulations defining the classifications (e.g., a name or address may be assigned a lower level of classification/categorization, while an account number or social security number may be assigned a higher classification/categorization). Similar to the determination of first data security classification, the determination of second data security classifications may provide for machine learning processing to learn, over time, from previously processed data files, which data elements require second data security classification and/or the second data security classification(s) to be assigned to the data elements that require such. Learned data elements and/or learned second data security classifications may be used to predict which data elements require classification and the second data security classification to assign to those data elements.

At Event 1050, the first and/or second data security classification is identified within the data file. The first and/or second data security classification may be identified in the data file by tagging data elements with the data security classification(s) and or adding fields to the data file that include the first and/or second data security classification(s).

Referring to FIG. 6 a flow diagram is present of a method 1100 for classifying requests that require access to data, specifically data that is governed by internal or external data security guidelines/regulations, in accordance with specific embodiments of the present invention. As previously discussed the method, which is a computer-implemented method executed by one or more processors, is executed immediately prior to or in-line with a point of entry, such as firewall or the like.

At Event 1110, a request is received that requires access to data stored within or accessible to a trusted internal computing network. As previously noted the request may be received from various different request channels, including but not limited to, email, text/SMS, online platform, mobile application, telephone, facsimile, in-person (e.g., at internal entity facility), electronic telecommunications device (e.g., ATM) or the like. As such the requests may require formatting/standardization in order for the request to be analyzed.

At Event 1120, one or more request parameters are determined/identified. The request parameters may include, but are not limited to, (i) the requester, (ii) an origin (location from which the request originates) associated with the request, (iii) the data owner(s) whose data is being accessed, (iv) one or more actions associated with the request, and/or (v) the data elements (i.e., specific data) that is required to be accessed. The request parameters may be determined from the body of the request and/or metadata associated with the request, such as IP address, telephone number and the like.

At Event 1130, a data classification is determined and assigned to the data request based on one or more of the previously determined/identified request parameters. In specific embodiments of the invention, the determination is made by accessing a database or applying a rules-based engine that correlates the request parameters to rules and/or regulations defining the classifications. The determination of the data security classification for the request may provide for machine learning processing to learn, over time, from previously processed requests, which requests require data security classification and/or the data security classification(s) to be assigned to the request. Learned data security classifications may be used to predict which requests require classification and the data security classification to be assigned to those requests.

At Event 1140, the request is routed within the trusted internal computing network in accordance with the assigned data security classification. In specific embodiments of the invention, the request is routed to classification-specific queue, which insures that the data in the request is properly handled in accordance with the rules and regulations specified by the assigned data security classification. The determination of the request routing may provide for machine learning processing to learn, over time, from previously processed requests, routes for specific classifications. Learned request routes may be used to predict which route to assign to a specific request.

Thus, present embodiments of the invention providing systems, apparatus methods and/or the like for classifying requests associated with personal data at or before a point of entry of a trusted internal computing network. The invention provides for determining whether a request associated with personal data requires classification (for example, whether the request is impacted by regulations or other requirements necessitating classification/categorization). The determination may be based on what entity is requesting the data, the origin of the request, whose data is being requested, the type of action associated with the request and/or the data elements associated with the request. In addition, once the request has been determined to require classification the classification is determined and assigned to the request. The classification may be determined based on the rules associated with the regulation or other requirement(s) necessitating the classification/categorization. The classification may identify rules for processing the request along with routing for the request (e.g., communicating the request to a predetermined queue designated for specific classification types).

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for data security, the system comprising:
a trusted internal computing network; and
a computing platform including a memory and at least one processor in communication with the memory, wherein the memory stores instructions that are executable by the at least processor and configured to:
receive a request for access to personal data stored within the trusted internal computing network, wherein the request is made by a calling-party during an ongoing voice call,
capture data associated with the ongoing voice call including a streaming audio file of the ongoing voice call and metadata associated with the voice call, while the voice call is ongoing:
format and structure the data into a standardized format;
in response to formatting and structuring the data into the standardized format, determine (i) the calling-party, (ii) an origin of the voice call, (iii) one or more types of action associated with the request, wherein the types of action include accessing data, changing data, deleting data, using data, (iv) one or more owners of the personal data being accessed, changed, deleted or used, and (v) one or more personal data elements that are required to be accessed, changed, deleted or used based on the request, wherein (i)-(v) are determined by (a) inputs provided by the calling party during the ongoing voice call, (b) voice analysis processing performed on the streaming audio file, and (c) machine learning processing,
implement a rules-based engine to determine and assign a data security classification to the request based on the determined (i) the calling-party, (ii) the origin of the voice call, (iii) the one or more types of action associated with the request, (iv) the one or more owners of the personal data being accessed, changed, deleted or used, and (v) the one or more personal data elements that are required to be accessed, changed, deleted or used based on the request, and
route the voice call in accordance with the assigned data security classification to a data security classification-specific response processing queue.

2. The system of claim 1, wherein the instructions further comprise machine learning instructions configured to progressively learn information including at least one selected from the group of (i) the calling-party, (ii) the origin of the voice call, (iii) the one or more owners of the personal data being accessed (iv) the one or more types of action associated with the request, and (v) the one or more personal data elements that are required to be accessed based on the request.

3. The system of claim 2, wherein the instructions are further configured to determine at least one selected from the group of (i) calling-parties, (ii) origins of voice calls, (iii) one or more owners of personal data being accessed, (iv) one or more types of action associated with requests, and (v) one or more personal data elements that are required to be accessed based on requests.

4. The system of claim 2, wherein the machine learning instructions are further configured to progressively learn data security classifications to assign to the request based on previous execution of the machine learning instructions.

5. The system of claim 4, wherein the instructions are further configured to determine the data security classification by predicting the data security classification based on at least one selected from the group of (i) the learned data security classifications, (ii) the metadata included in the request, and (iii) composite metadata compiled within the trusted internal computing network.

6. The system of claim 1, wherein the instructions further comprise machine learning instructions configured to progressively learn routing information based on previous requests processed by the machine learning instructions.

7. The system of claim 6, wherein the instructions are further configured to determine a routing for the voice call based on the learned routing information.

8. The system of claim 1, wherein the instructions are further configured to respond to the request by accessing a source of truth database to retrieve verified data elements associated with performing the request.

9. The system of claim 1, wherein the instructions are further configured to receive the request from an entity external to the trusted internal computing network or from an entity internal to the trusted internal computing network.

10. An apparatus configured for data security, the apparatus comprising:
a computing platform including a memory and at least one processor in communication with the memory, wherein the memory stores instructions that are executable by the at least processor and configured to:
receive a request for access to personal data stored within a trusted internal computing network, wherein the request is made by a calling-party during an ongoing voice call,
capture data associated with the ongoing voice call including a streaming audio file of the ongoing voice call and metadata associated with the voice call, while the voice call is ongoing:
format and structure the data into a standardized format,
in response to formatting and structuring the data into the standardized format, determine (i) the calling-party, (ii) an origin of the voice call, (iii) one or more types of action associated with the request, wherein the types of action include accessing data, changing data, deleting data, using data, (iv) one or more owners of the personal data being accessed, changed, deleted or used, and (v) one or more personal data elements that are required to be accessed, changed, deleted or used based on the request, wherein (i)-(v) are determined by (a) inputs provided by the calling party during the ongoing voice call, (b) voice analysis processing performed on the streaming audio file, and (c) machine learning processing,
implement a rules-based engine to determine and assign a data security classification to the request based on the determined (i) the calling-party, (ii) the origin of the voice call, (iii) the one or more types of action associated with the request, (iv) the one or more owners of the personal data being accessed, changed, deleted or used, and (v) the one or more personal data elements that are required to be accessed, changed, deleted or used based on the request, and
route the voice call in accordance with the assigned data security classification to a data security classification-specific response processing queue.

11. The apparatus of claim 10, wherein the instructions further comprise machine learning instructions configured to progressively learn information including at least one selected from the group of (i) calling-parties, (ii) origins of voice calls, (iii) one or more owners of personal data being accessed, (iv) one or more types of action associated with requests, and (v) one or more personal data elements that are required to be accessed based on requests.

12. The system of claim 11, wherein the instructions are further configured to determine, based on the information learned by the machine learning instructions, at least one selected from the group of (i) the calling-party, (ii) the origin of the voice call, (iii) the one or more owners of the personal data being accessed, (iv) the one or more types of action associated with the request, and (v) the one or more personal data elements that are required to be accessed based on the request.

13. The system of claim 10, wherein the instructions further comprise machine learning instructions configured to progressively learn data security classifications to assign to the request based on previous execution of the machine learning instructions and wherein the instructions are further configured to determine the data security classification by predicting the data security classification based on at least one selected from the group of (i) the learned data security classifications, (ii) the metadata included in the request, and (iii) composite metadata compiled within the trusted internal computing network.

14. A computer-implemented method for providing data security, the computer-implemented method is implemented by one or more processing devices and comprising:
  receiving a request for access to personal data stored within a trusted internal computing network, wherein the request is made by a calling-party during an ongoing voice call,
  capture data associated with the ongoing voice call including a streaming audio file of the ongoing voice call and metadata associated with the voice call, while the voice call is ongoing:
  formatting and structuring the data into a standardized format;
  in response to formatting and structuring the data into the standardized format, determining (i) the calling-party, (ii) an origin of the voice call, (iii) one or more types of action associated with the request, wherein the types of action include accessing data, changing data, deleting data, using data, (iv) one or more owners of the personal data being accessed, changed, deleted or used, and (v) one or more personal data elements that are required to be accessed, changed, deleted or used based on the request, wherein (i)-(v) are determined by (a) inputs provided by the calling party during the ongoing voice call, (b) voice analysis processing performed on the streaming audio file, and (c) machine learning processing;
  determining, by a rules-based engine, a data security classification and assigning the data security classification to the request based on the determined (i) the calling-party, (ii) the origin of the voice call, (iii) the one or more types of action associated with the request, (iv) the one or more owners of the personal data being accessed, changed, deleted or used, and (v) the one or more personal data elements that are required to be accessed, changed, deleted or used based on the request; and
  routing the voice call in accordance with the assigned data security classification to a data security classification-specific response processing queue.

* * * * *